(12) United States Patent
Kombowski

(10) Patent No.: US 7,926,635 B2
(45) Date of Patent: Apr. 19, 2011

(54) PISTON ASSEMBLY AND A FORCE TRANSFER DEVICE, PARTICULARLY A FORCE TRANSFER DEVICE WITH A PISTON ASSEMBLY

(75) Inventor: Eugen Kombowski, Buehl (DE)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 671 days.

(21) Appl. No.: 12/002,992

(22) Filed: Dec. 19, 2007

(65) Prior Publication Data

US 2008/0156608 A1 Jul. 3, 2008

(30) Foreign Application Priority Data

Dec. 27, 2006 (DE) .......................... 10 2006 061 552
Dec. 27, 2006 (DE) .......................... 10 2006 061 553

(51) Int. Cl.
*F16D 25/10* (2006.01)
*F16H 45/02* (2006.01)

(52) U.S. Cl. ..................... 192/3.26; 192/3.3; 192/48.61; 192/48.617

(58) Field of Classification Search ........ 192/3.25–3.27, 192/48.61, 48.616–48.619
See application file for complete search history.

(56) References Cited

U.S. PATENT DOCUMENTS

| 5,029,685 A | * | 7/1991 | Takase et al. | ............. 192/48.91 |
| 5,699,887 A | * | 12/1997 | Kundermann | ............... 192/3.26 |
| 2007/0074943 A1 | * | 4/2007 | Hemphill et al. | ............ 192/3.25 |

* cited by examiner

*Primary Examiner* — Rodney H Bonck
(74) *Attorney, Agent, or Firm* — Simpson & Simpson, PLLC

(57) ABSTRACT

A piston assembly for arrangement in a pressure cavity in a force transfer device for operating a first and a second actuatable clutch device, comprising a piston element associated respectively with an actuatable clutch device. The invention is characterized in that the piston element of the second clutch device is guided at the piston element of the first clutch device movable against a stop, forming an additional second cavity, loadable with pressure medium, wherein the first piston element is movable in an axial direction, relative to the piston element of the second clutch device.

20 Claims, 2 Drawing Sheets

PISTON ASSEMBLY AND A FORCE TRANSFER DEVICE, PARTICULARLY A FORCE TRANSFER DEVICE WITH A PISTON ASSEMBLY

CROSS REFERENCE TO RELATED APPLICATIONS

This patent claims priority of German Patent Application No. 10 2006 061 552.2, filed on Dec. 27, 2006 and German Patent Application No. 10 2006 061 553.0, filed on Dec. 27, 2006, which applications are incorporated herein by reference.

FIELD OF THE INVENTION

The invention relates to a piston assembly for operating two actuatable clutch devices in a force transfer device; furthermore it relates to a force transfer device, in particular a force transfer device with such piston assembly.

BACKGROUND OF THE INVENTION

Force transfer devices, which are disposed between a drive engine and a transmission unit, are known in a plurality of embodiments in the state of the art. They typically comprise an input and at least one output, wherein the input can be coupled to a drive engine at least indirectly, this means directly, or through further transfer elements, and at least one output, which is coupled to a transmission unit, which is disposed subsequent to the force transfer device, typically a change speed transmission. Between the input and the output, a hydrodynamic component, preferably in the form of a hydrodynamic speed/torque converter, is disposed. It comprises at least a first shell, designated as pump shell, and a second shell designated as turbine shell, in the force flow from the input to the output. For bridging the hydrodynamic power transfer, a device in the form of a lockup clutch, functioning as an actuatable clutch device is provided. It comprises a first clutch component and a second clutch component, which can be brought into operative engagement with each other, at least indirectly. The lockup clutch is thus used for coupling with the input, or for connecting between the input and the pump shell and the turbine shell. The operation is performed through an operating device which comprises in the simplest case, an actuator in the form of a piston element. Typically, there is a direct coupling between the turbine shell and the output, and thus also with a subsequent transmission unit. Depending on the embodiment, the hydrodynamic speed/torque converter, or the entire force transfer device is provided as a two- or three-channel unit. When provided in three-channel construction, the actuator is thus loaded with a pressure, which is controllable separately. The other pressure cavities in the force transfer device, particularly the operating cavity in the speed/torque converter and the intermediary space between the hydrodynamic speed/torque converter and the lockup clutch, and the actuator are the flowed through either in a centripetal or centrifugal manner, wherein an external circulation loop is created through the particular connections at the pressure cavities, which is utilized as a cooling means for the established flow circulation in the hydrodynamic speed/torque converter. Typically, the power transfer in a certain operating range is purely hydrodynamic. In this case, the force flow between the input and the output is performed through the hydrodynamic component. The primary shell, functioning as pump shell, is thus directly coupled to the drive engine, and the turbine shell is coupled to the output, or to the input of the subsequent change speed transmission. In particular in order to avoid the disadvantage of reduced efficiency in vehicle applications at high revolutions through the system specific slippage, the lockup clutch is activated and the power is transferred mechanically between the input and the output of the force transfer device, through the mechanical power path, circumventing the hydrodynamic power path. Thus, the force flow can pass through the particular power paths alternatively, or through both simultaneously with a power split. When the drive engine is idling, particularly in coasting mode, the drive engine can be separated from the output by the lockup clutch, however, with a filled hydrodynamic component, which is the case for the hydrodynamic speed/torque converter also in bridged mode, torque is still being transferred into the hydrodynamic component, which results in a power loss when the engine is idling. Furthermore torque spikes are transferred from the drive side into the hydrodynamic component. Therefore a clutch device is provided for decoupling the drive engine from the transmission, which is used for decoupling the pump shell, and thus for decoupling the drive engine from a transmission unit, disposed subsequent to the force transfer device. The pump shell clutch is thus only required for this operating range. The pump shell clutch requires a separate actuation and is also often disposed in a range, which leads to the enlargement of the required installation volume in radial or axial direction. Moreover, the hydrodynamic component still remains functionally associated with the transmission unit through the connection to the turbine shell.

SUMMARY OF THE INVENTION

Therefore it is the object of the invention to refine a force transfer device as described above, so that it is provided as a multi function unit, this means it comprises at least one additional actuatable clutch, and furthermore maintains the three channel principle, which is already known for the force transfer devices, and which is characterized by a small size in axial and in radial direction.

A force transfer device according to the invention with an input and an output, and two actuatable clutch devices located in between, which are disposed in a pressure cavity surrounded by a housing, is characterized in that an actuator in the form of a piston element is associated with each clutch device and one of the clutches is supported in axial direction at the piston element of the other clutch device.

Through the solution according to the invention it is possible to avoid a direct connection and support of the clutch elements at the housing, and to create an independent operating device for the particular clutch devices, which is free from axial force effects, imparted upon the connecting elements, connected directly to said clutch devices. Thus, in a particularly advantageous embodiment, one of the clutches is disposed, so that it is possible to set a higher pressure in it, than in the surrounding area. This type of support is realized through a piston assembly according to this invention, comprising a first piston element, associated with the first actuatable clutch device, and a second piston element, associated with the second actuatable clutch device, wherein the second piston element is guided at the first piston element, so it is movable in axial direction, forming a pressure chamber with it, which can be pressurized with pressure means, wherein this pressure chamber is airtight and leak proof relative to the inner cavity of the housing. Furthermore, one respective clutch component of the first and the second actuatable clutch device is arranged at the piston element, so that the arrangement can be performed here completely detached from an arrangement inside the housing, this means, from a direct non-rotatable connection of these clutch elements with the housing. Thus, the piston arrangement is optional with respect to its position in axial direction in the force transfer device. This allows for different actuation concepts, as well as for a space saving arrangement of the piston assembly.

This piston assembly furthermore allows the realization of a second pressure cavity inside another first pressure cavity, with little effort, while still being able to actuate all other actuatable clutch devices independently from each other. This is realized through both piston elements being movable relative to each other, wherein this movability inside the force transfer device is generated by the pressure differences in the pressure cavities, loading the piston elements. Furthermore it is possible with this type of piston assembly to facilitate a parallel operating mode of two actuatable clutch devices, thus realizing an embodiment with power split in the form of a parallel arrangement of a mechanical power path and a hydrodynamic power path.

The force transfer device comprises at least one hydrodynamic component and one actuatable clutch device in the form of a lockup clutch. Furthermore, one additional actuatable clutch device is provided. It forms a first actuatable clutch device for the piston assembly, wherein the first actuatable clutch device in a multi function unit is preferably formed by a pump shell clutch for optional coupling or decoupling the pump shell with or from the input of the force transfer device, or a drive engine, coupled therewith, thus facilitating the de-coupling of the hydrodynamic component. After this de-coupling, merely the turbine shell of the hydrodynamic component is still coupled to the output non-rotatably and is dragged along. The second actuatable clutch device is formed by the lockup clutch. Thus it is arranged in a way, which leads to the piston force of the lockup clutch being supported in one direction indirectly at the piston of the pump shell clutch, and the closing force simultaneously acting upon the pump shell clutch in the other direction. Depending on the design, this either leads to the automatic disengagement of the pump shell clutch with the actuation of the lockup clutch through the design of the pressure conditions, or it remains actuated at a higher pressure. The piston assembly is thus supported non-rotatably at the transmission input shaft, which forms the output. This support can be performed directly or indirectly, preferably it is performed by an element, coupled non-rotatably with the gearbox output, provided as a hub. The piston assembly is thus axially fixated in one direction. Thus it is sufficient to utilize a combined axial- and radial bearing, which is associated with the first piston element, supporting it in axial direction at the face side, facing away from the second piston element. The support in the other direction thus occurs indirectly through providing a fixed stop at the first piston element, through which the second piston element and a component of the second actuatable clutch device are supported. Furthermore one respective clutch component of the first and the second actuatable clutch device is located in the first piston element, or the piston element carries them.

With respect to the engineering design there are a multitude of possibilities. Preferably the design of the particular piston surfaces is performed, so that they are provided almost with the same size with respect to the surface areas defining the pressure cavity, in order to be able to impart no axial forces, or only very small axial forces upon the connecting elements. Thus, a completely self contained unit can be provided, which is free of axial force effects upon the connecting elements.

BRIEF DESCRIPTION OF THE DRAWINGS

The solution according to the invention is subsequently described with reference to figures. Therein the following is shown in particular.

DETAILED DESCRIPTION OF THE INVENTION

Figure 1:
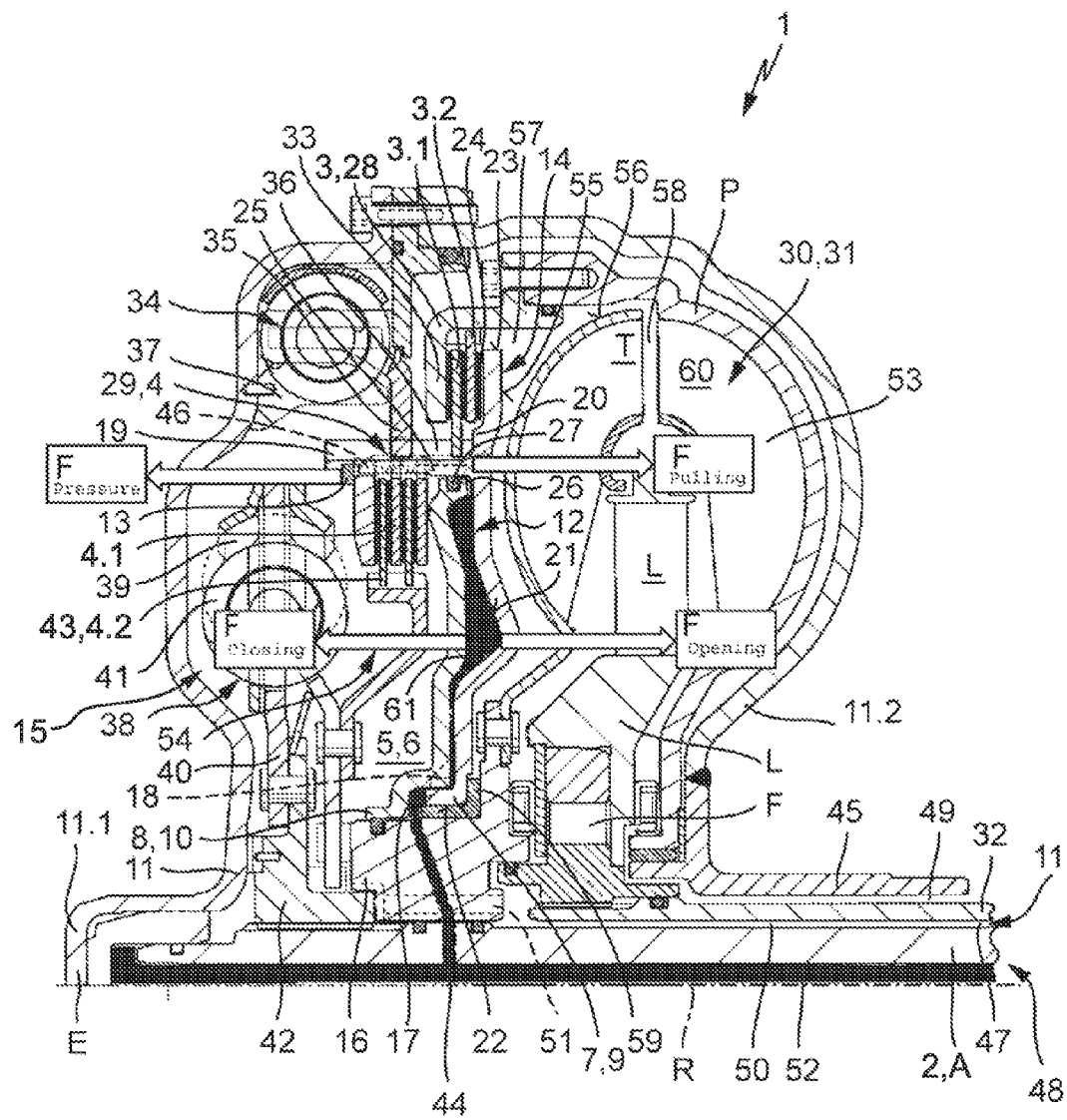
FIG. 1 illustrates the basic layout of a force transfer device, comprising a piston assembly according to the invention in a simplified schematic depiction; and, FIG. 2 illustrates an embodiment of a piston assembly according to the invention, as it can be employed for any type of force transfer device with multiple, in particular two, actuatable clutch devices according to the invention.

FIG. 1 illustrates an embodiment of force transfer device 1 according to the invention with reference to an axial cross section for arrangement in a drive train between a drive engine and a transmission, comprising input E and output A, wherein output A is formed by shaft 2 in the form of a transmission input shaft. It comprises two actuatable clutch devices between input E and output A, first actuatable clutch device 3 and second actuatable clutch device 4. The particular actuatable clutch devices 3 and 4 thus comprise at least first clutch component 3.1, or 4.1 and second clutch component 3.2 or 4.2, wherein the two clutch components 3.1 and 3.2 or 4.1 and 4.2 can be brought into at least indirect operative engagement. At least indirect means direct or indirect in this case. This depends on the design of clutch components 3.1, 3.2 or 4.1, 4.2. Two actuatable clutch devices 3 and 4 are thus arranged in inner space 6 of force transfer device 1, forming cavity 5, which can be loaded with a pressure or operating means. The term "pressure cavity" means the chambers or interspaces, which can be loaded with operating means or pressure means. Actuator 7 or 8 is associated with each of actuatable clutch devices 3 and 4, wherein each actuator comprises one respective piston element 9 and 10. Inner cavity 6 is thereby enclosed by housing 11. Housing 11 is supported rotatably and it is preferably provided from several components. First housing component 11.1 functions as input E of force transfer device 1. It is provided as a cover and it is connected to second housing component 11.2 non-rotatably. Both housing components 11.1 and 11.2 thus enclose hydrodynamic component 30 in the axial direction as well as in the circumferential direction, forming inner cavity 6. Two actuatable clutch devices 3 and 4 are also located in this cavity, wherein the assembly is performed, so that the operating means pressure, in particular the oil pressure of clutch device 3 or 4 can be set higher in their interior, than the pressure in surrounding inner space 6. This clutch device is thus supported in the axial direction at the piston element of the other clutch device. According to the invention, clutch devices 3 and 4 are not attached to housing 11, in particular not attached to the housing wall, but the actuator of one of the actuatable clutch devices in the form of the piston element is guided at the actuator of the respective other actuatable clutch device in the form of a piston element, and it is also a clutch element of the respective clutch device. In this illustrated case actuator 8 of second actuatable clutch device 4 is guided movably in the axial direction at actuator 7, in particular first piston element 9 of first actuatable clutch device 3, forming cavity 12, which can be pressurized. Furthermore, first clutch component 4.1 of second actuatable clutch device 4 is disposed or supported at first piston element 9. The axial movement of first clutch component 4.1 is limited by fixed stop 13 at first piston element 9. Thus one of the two clutch devices, in this case second actuatable clutch device 4, is disposed in inner cavity 6, so that the oil pressure in the interior, in particular the pressure acting upon piston element 10, can be set higher, than the pressure in the surrounding area, in particular the pressure in inner cavity 6. This increased setting is realized by additionally formed cavity 12, which can be loaded with pressure means. This additional cavity 12 for loading second piston element 10 of second switchable clutch device 4 is thus located in first cavity 5. The arrangement is performed coaxial to the rotation axis R of force transfer device 1. Two piston elements 9 and 10 thus form piston assembly 14, which, based on its design and construction in combination with the respective design of the piston surfaces, exerts no axial forces, or only small axial forces onto the respective connection elements, and thus in its entirety forms a self contained unit, wherein, however, individual piston elements 9 and 10 are movable independently, this means relative to each other. Piston assembly 14 is thus at least indirectly supported at output A, in particular at transmission input shaft 2, in this illustrated case at hub 16, connected at least indirectly non-rotatably therewith, in this case through vibration damping device 15. Thus, both piston elements 9 and 10 are supported in the illustrated case in the radial direction at hub 16, movable in the axial direction, and pressure and, preferably, also liquid tight in the area of their portion 17, 18, forming an inner circumference, wherein the support is performed without a non-rotatable connection of particular piston element 9 and 10 with hub 16. Further conceivable is the possibility, which is not shown here, to guide second piston element 10 at first piston element 9 in the section of portion 18, forming the inner circumference. First piston element 9 of first actuatable clutch device 3 is therefore provided as annular or disk shaped element, which comprises, viewed in radial direction, protrusion 19, extending in the axial direction, dividing front face 20, pointing towards second piston element 10, into two piston surface portions, first piston surface portion 21, extending in the radial direction from the inner circumference or the inner diameter 22 in the radial direction towards the outside, up to protrusion 19, while defining cavity 12, and a second surface portion, extending at protrusion 19 in the radial direction, up to the outer circumference of piston element 23, forming surface area 24, entering into operating engagement with particular clutch components 3.1 and 3.2, by functioning as a compression surface. Second piston element 10 is guided, axially movable, but pressure and liquid tight, at first piston element 9, in particular in the section of the portion of protrusion 19, forming inner circumference 25. For this purpose, seal device 27 is provided between outer circumference 26 of second piston element 10 and inner circumference 25 of first piston element 9, in particular of protrusion 19. Furthermore, first clutch component 4.1 of second actuatable clutch device 4 is guided at inner circumference 25, axially movable, and stop 13, which is fixed relative to first piston element 9, is also located there, wherein first clutch component 4.1 is disposed between fixed stop 13 and piston element 10. Thereby, it becomes possible, that an operating engagement is established between clutch component 4.1 and 4.2, when second piston element 10 is actuated, wherein second actuatable clutch device 4 is then supported at piston element 9 through fixed stop 13. The particular actuatable clutch devices 3, 4 are preferably provided as mechanical friction locked clutch devices, this means they can be operated with slippage. They comprise elements, bearing or forming friction liners, belonging to the first clutch components, and second elements, which can be brought into operative engagement with them, in order to create friction locking at second clutch component 4.2, or vice versa. The friction surface bearing elements, or the elements, which can be brought into operative engagement with them, are thus provided in the form of disk shaped elements, in particular multi-disks. In the present case, one respective clutch component, a first or a second clutch component of the particular clutch devices is formed by an outer multi disk carrier with respective outer multi disks, and the respective other clutch component is formed by an inner multi disk carrier with inner multi disks. Thus, in the illustrated case, due to the high functional concentration in piston assembly 14, first piston element 9 simultaneously functions as inner and outer disk carrier for two clutch devices 3, 4. Other embodiments are conceivable. Force transfer device 1 according to FIG. 1 illustrates an advantageous embodiment as a multifunctional unit with embodiment of first actuatable clutch device 3 as a so-called pump shell clutch 28, and second actuatable clutch device 4 as lockup clutch 29. Force transfer device 1 thus comprises a hydrodynamic component, besides actuatable clutch devices 3 and 4, which is provided as hydrodynamic speed/torque converter 31, depending on the embodiment, or it can also be provided as a hydrodynamic clutch. In the illustrated embodiment, hydrodynamic speed/torque converter 31 is depicted. It is used for converting speed and torque when transferring power between input E and output A. Hydrodynamic speed/torque converter 31 comprises a first bladed shell, functioning as pump shell P, and a second bladed shell, functioning as turbine shell T, when transferring power from input E to output A, wherein the pump and the turbine shell form an operating cavity 60, which can be filled with operating means, or which in particular is filled with operating means. Furthermore, at least one stator shell L is provided. In the illustrated embodiment, hydrodynamic speed/torque converter 31 is preferably provided as a Trilok converter. Stator shell L is thus supported by freewheeling clutch F either at a spatially fixed element, or at a rotatable shaft. In the illustrated embodiment, the support is performed at support shaft 32. Hydrodynamic speed/torque converter 31 forms hydrodynamic power path 53. For this purpose, pump shell P can be connected at least indirectly non-rotatably with input E of force transfer device 1. In the illustrated embodiment of force transfer device 1 as a multifunctional unit, the non-rotatable connection is not performed directly and continuously, but through pump shell clutch 28 in the form of first actuatable clutch device 3. With the clutch device, an optional coupling or decoupling of hydrodynamic component 30 from input E is possible. First actuatable clutch device 28 is thus disposed between pump shell P and input E, or housing 11 coupled therewith. Pump shell P comprises pump shell dish 33, which is connected non-rotatably with second clutch component 3.2 of pump shell clutch 28, and first clutch component 3.1, which is connected at least indirectly non-rotatably with input E, here housing component 11.1, through device 34 for damping vibrations. Device 34 thus comprises primary component 37, designated as an input component in the force flow from input E to output A, and a secondary component, wherein both are coupled through means for spring and/or damping coupling amongst each other, and rotatable relative to each other in the circumferential direction within limits. In the illustrated case, the coupling is performed quasi indirectly through connecting secondary component 35 with inner disk carrier 36 of first clutch component 3.1, which is formed by protrusion 19 at first piston element 9. Primary component 37 of device 34 for damping vibration is thus connected non-rotatably with input E. The driving can thus be performed through flex plates or through a tooth rim. Other possibilities are also conceivable. The decisive fact is that driving can be performed in some manner. Furthermore, also, a non-rotatable coupling with the housing component would be possible by connecting it non-rotatably with first piston element 9. However, torque spikes induced by the drive engine would then be transferred into piston assembly 14 without restrictions, which, as a unit, can then transfer them to the other connection elements.

Here, housing 11 encloses the particular elements of force transfer device 1 in circumferential direction and in the axial direction, forming inner cavity 6. Among these elements are, besides hydrodynamic component 30, piston assembly 14, two actuatable clutch devices 3 and 4, and device 34 for damping vibrations, and another device 38 for damping vibrations, connected upstream of output A, in particular transmission input shaft 2 in the direction of the force flow from the input to the output, wherein the device also comprises primary component 39 and secondary component 40, coupled through means 41 for spring and/or damping coupling, wherein primary component 39 and secondary component 40 are rotatable relative to each other in the circumferential direction. Also here, device 38 for damping vibrations acts as a quasi elastic clutch. Secondary component 40 is thus connected non-rotatably with output A, or transmission input shaft 2. The coupling is performed through hub 42, connected non-rotatably with transmission input shaft 2, at which secondary component 40 is connected non-rotatably. Primary component 39 is connected non-rotatably with second actuatable clutch device 4, and furthermore with turbine shell T. Thus the coupling of turbine shell T with primary component 39 is performed through hub 16, which is used for supporting piston assembly 14. The non-rotatable coupling of hub 16 with transmission input shaft 2 is thus performed through a non-rotatable coupling of it with primary component 39. Furthermore, primary component 39 is connected non-rotatably with second actuatable clutch device 4, in particular second clutch component 4.2. First clutch component 4.1 is connected non-rotatably with piston element 9, or formed and supported at it. First clutch component 4.1 of second actuatable clutch device 4 is thus formed by an outer multi disk carrier, which is formed by piston element 9 and in which outer multi disks are guided axially movable. Second clutch component 4.2 is formed by an inner multi disk carrier, which is designated, e.g., with 43 here, and which carries inner multi disks and which is connected non-rotatably with primary component 39. With respect to the actual design of device 34 and 38 for damping oscillations, there is a multitude of possibilities. These are provided differently, depending on the operating principle, thus, they are different mostly with respect to the design of the means for spring- and/or damping coupling. Thus, the spring coupling serves as a functional unit for transferring torque, while the damping coupling takes over in particular the damping properties, wherein the means for spring and/or damping coupling can also be provided by the same elements, in particular the means for spring and/or damping coupling. When the damping is performed purely mechanical, spring units are used as means for spring and/or damping coupling, while in case of hydraulic damping, additionally preferably damping chambers can be provided, which can be filled with a damping medium. For describing the function, subsequently the particular said cavities, which can be loaded with operating- or pressure means, are designated as second or third pressure cavity. Thus, the first pressure cavity is formed by inner cavity 6, the second pressure cavity is formed by cavity 12 in piston assembly 14, and the third pressure cavity is formed by operating space 60 in hydrodynamic component 30. Force transfer device 1 is thus provided as a three-channel unit, though it is supplemented with an additional actuatable clutch device, this means only three pressure cavities are provided, which can be loaded with pressure medium through respective connections, or which are used for conducting the operating means of the hydrodynamic component, and by which the function of force transfer device 1 can be controlled through the pressure differences. To each of the particular pressure cavities, the first pressure cavity in the form of pressure cavity 5, the second pressure cavity in the form of pressure cavity 12, and the third pressure cavity in the form of operating cavity 60, in hydrodynamic component 30, in particular the pressure cavity provided between pump shell P and turbine shell T, at least one connection 47, 48 or 49 is associated, wherein the term connection is to be understood from a functional point of view, this means, it does not include a defined engineering embodiment, but only includes the possibility to control the pressure, or the pressure means supply or release. In the illustrated case, first connection 47 is coupled with pressure cavity 5, furthermore extending between support shaft 32 and transmission input shaft 2. The connection of intermediary space 50 between support shaft 32 and transmission input shaft 2 with inner cavity 6 is performed through respective conductive connections, in particular channels 51 in hub 16. Second connection 48 is used for supplying pressure cavity 12 with pressure medium. The pressure means supply is performed through central channel 52 in transmission input shaft 2, connected to pressure cavity 12 through connection channel 44, extending through transmission input shaft 2, and hub 16 in the radial direction. Thus, channels 51 and 44 in hub 16 are provided offset relative to each other in the circumferential direction and formed with a different operating means supply, this means viewed in cross section, they would cross over when projected into a plane, this means they would be free from a parallel position relative to each other. Third connection 49 is formed by the connection to operating cavity 60 as a third chamber. It is provided between housing 11 or housing shaft 45 and support shaft 32.

The operating mode of a force transfer device thus provided in the form of a multifunctional unit with the clutch and piston assembly according to the invention is described subsequently. Thus, a differentiation is made between a purely hydrodynamic, purely mechanic and combined hydrodynamic/mechanic power transfer, wherein the latter also comprises the parallel power transfer in the hydrodynamic and mechanical path as a power split during slipping operation. In this case, the force flow through hydrodynamic component 30 is designated as hydrodynamic path 53, while the force flow direction through the lockup clutch, circumventing hydrodynamic component 30 is designated as mechanical path 54. The functional states are thus determined substantially through the pressure differences between pressure cavities 5, 6, 12 and 60, adjacent to particular piston elements 9, 10. Accordingly, means for pressure control at the particular connections are provided, which are not shown here. During purely hydrodynamic power transfer, this means during power transfer in hydrodynamic path 53, the force flow goes directly from input E to output A through hydrodynamic component 30, this means, in the present case, through housing 11, device 34, onto piston element 9, pump shell clutch 28, to pump shell P, through the flow cycle, established in the pressure cavity, or in operating cavity 60 of turbine shell T, onto hub 16, device 38 for damping vibrations and through hub 42 onto transmission input shaft 2. In this case, pump shell clutch 28 is actuated, this means closed. Piston element 9 can thus be loaded with pressure on its face side 55, facing towards the hydrodynamic component. This pressure corresponds to the pressure in first pressure chamber 5, this means inner cavity 6, wherein the pressure means conduction is performed here through connection channels 46, disposed in piston element 9, preferably in the portion formed by protrusion 19 into space 57, formed between piston element 9 and outer circumference 56 of hydrodynamic component 30. Hydrodynamic component 30 is thus flowed through in a centripetal or centrifugal manner. This is controlled by the pressure conditions in the particular pressure cavities. The filling is thus performed preferably from the portion of outer circumference 56 in the radial direction at the outer diameter into separation gap 58 between pump shell P and turbine shell T into operating cavity 60. Clutch device 3 is closed due to the pressure in cavity 57. Thus, said pressure is greater than the pressure in pressure cavity 12, so that here a relative movement between piston element 9 and piston element 10 can be performed. Piston element 10 thus remains unchanged with respect to its position relative to second clutch device 4. The operating means is turned over in operating cavity 60 and causes a pickup of turbine shell T, due to the established flow cycle, and thus a power transfer to transmission input shaft 2. For cooling purposes, operating means is removed from operating cavity 60 for cooling purposes and added back again, also during the operation of hydrodynamic component 30, this means power transfer in hydrodynamic path 53. For this purpose, the operating means is removed through third connection 49, and through first connection 47, after external conduction, or conduction in an enclosed cycle within force transfer device 1, or supplied again on the outside. During purely mechanical power transfer pump shell clutch 28 is deactivated, this means hydrodynamic component 30 is decoupled, and lockup clutch 29 is activated. Thus, these states can be reached subsequently or in an overlapping manner, wherein during overlapping operation a parallel power transfer is possible, through operating the particular clutch devices with slippage. The locked up state is reached through loading pressure cavity 12, which causes an axial movement of piston element 10 in the direction of spatially fixated stop 13, so that two clutch components 4.1, 4.2, in particular the friction surface bearing elements constituting them can be brought into operative engagement with each other. In pressure cavity 12, pressure is simultaneously imparted onto piston 9 at front face 21, pointing away from hydrodynamic component 30, however, the system, in particular piston assembly 14 remains in equilibrium, due to the size of piston surface 21 at the first piston, and 61 at the second piston and the pressure in first pressure cavity 5. The power transfer between the input and output A is performed directly through lockup clutch 29, circumventing hydrodynamic component 30. In this state, there is equilibrium between a pressure force $F_{Pressure}$ loading stop 13, due to the pressure in pressure cavity 12, and the pull force $F_{Pulling}$, impacting first piston element 9, which also becomes effective as opening force $F_{Opening}$ at first clutch device 3, and as closing pressure $F_{Closing}$ at second clutch device 29.

Through the piston assembly, according to the invention, and the independent controllability of particular piston elements 9 and 10, furthermore also a parallel operation is possible. This means, that pump shell clutch 28 can be closed and simultaneously also lockup clutch 29, and thus the power transfer can be divided between a hydrodynamic and a mechanical power path 5.3 or 5.4. In this case the pressure in first pressure cavity 5 is greater than the pressure in second pressure cavity 12, so that additionally a relative motion between first and second piston element 9 and 10 can be performed, so that first piston element 9 is also being moved.

In the illustrated case, two piston elements 9 and 10 of piston assembly 12 are guided on hub 16. The support of first piston element 9 is performed through combined radial and axial straight bearing 59, simultaneously forming a stop in the axial direction for first piston element 9. This stop for piston element 9 thus defines the position of piston element 9 in the open state of the pump shell clutch.

Figure 2:
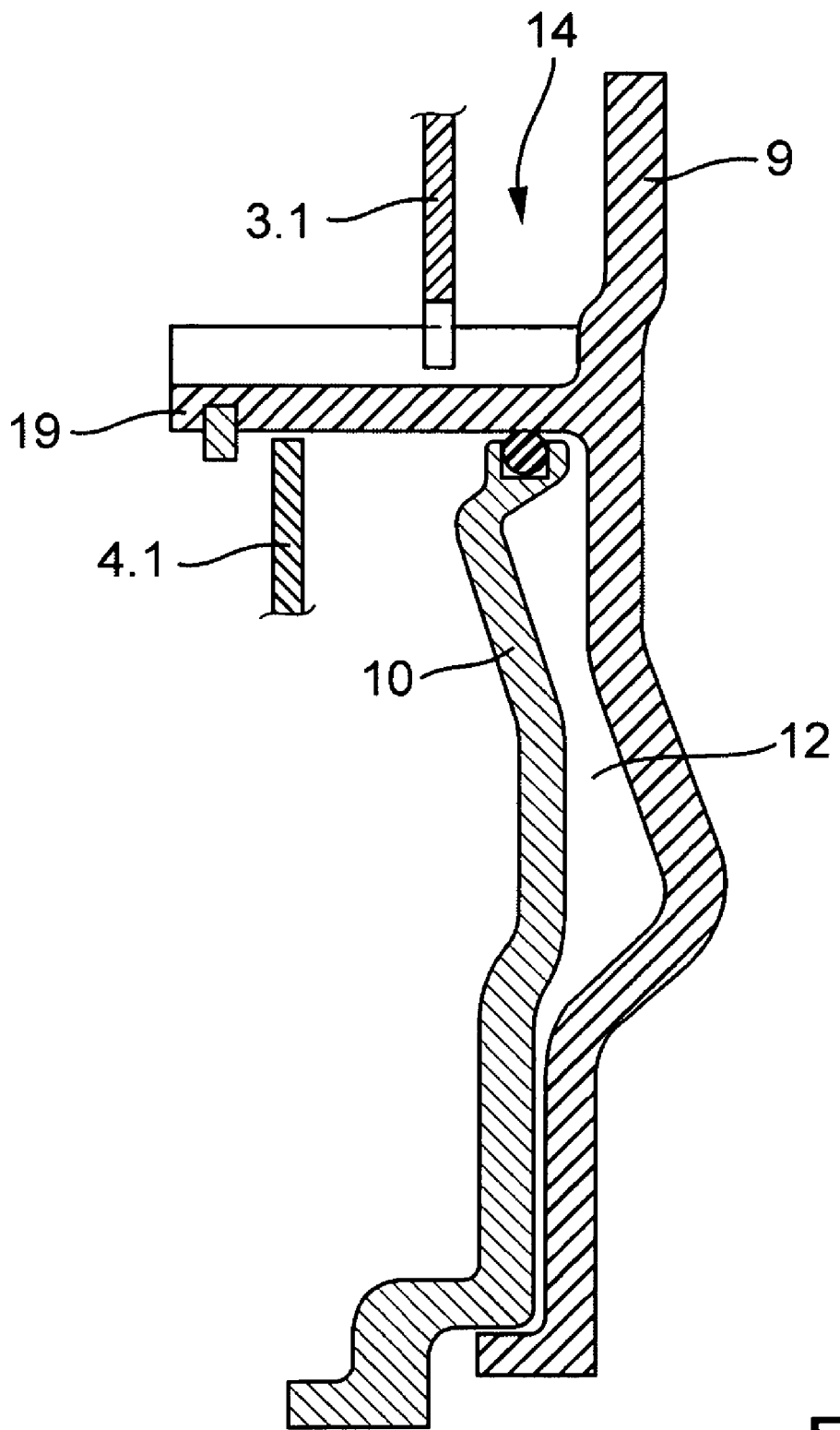

FIG. 1 illustrates a particularly advantageous embodiment in force transfer device 1 with two actuatable clutch devices. FIG. 2 only shows a piston assembly according to the invention as it can be used in any force transfer device. It is crucial that piston assembly 14 is comprised of two particular piston elements, forming pressure cavity 12, here piston elements 9 and 10, wherein second piston element 10 is supported movable in the axial direction at first piston element 9, and furthermore piston element 9 is a component of two clutch devices, e.g., of first and a second clutch device 3, 4, since it carries clutch elements 3.1 and 4.1. Through piston assembly 14 according to the invention, a single actuation of the particular actuatable clutch devices and also a parallel actuation become possible. Furthermore, also the setting of the pressure conditions at the particular piston surfaces can control the functional mode and each of the power paths can be operated by itself, or in parallel.

DESIGNATIONS 1 force transfer device
2 shaft, transmission input shaft
3 first actuatable clutch device
3.1 first clutch component
3.2 second clutch component
4 second actuatable clutch device
4.1 first clutch component
4.2 second clutch component
5 cavity
6 inner cavity
7 actuator
8 actuator
9 piston element
10 piston element
11 housing
11.1 first housing section
11.2 second housing section
12 cavity loadable with pressure means
13 fixed stop
14 piston assembly
15 vibration damping device
16 hub
17 inner circumference forming subsection
18 inner circumference forming subsection
19 first protrusion
20 front face
21 first surface section
22 inner diameter
23 outer circumference
24 surface section
25 inner circumference
26 outer circumference
27 sealing device
28 pump shell clutch
29 lockup clutch
30 hydrodynamic component
31 speed/torque converter
32 support shaft
33 pump shell dish
34 vibration damping device
35 secondary component
36 inner multi disk carrier
37 primary component
38 vibration damping device
39 primary component 40 secondary component
41 means for spring- and/or damping coupling
42 hub
43 inner multi disk carrier
44 connection channel
45 housing shaft
46 connection channel
47 connector
48 connector
49 connector
50 intermediary space
51 channel
52 channel
53 hydrodynamic path
54 mechanical path
55 front face
56 outer circumference
57 cavity
58 separation gap
59 combined axial and radial straight bearing
60 operating cavity
61 piston surface

What is claimed is:

1. A piston assembly (14) for arrangement in a first pressure cavity (5) of a force transfer device (1) for operating a first actuatable clutch device and a second actuatable clutch device (3, 4), comprising a first piston element and a second piston element (9, 10), said piston elements associated respectively with said first and second actuatable clutch devices (3, 4), wherein said second piston element (10) of said second clutch device (4) is guided axially by said first piston element (9) of said first clutch device (3) and movable against a stop (13), wherein a second pressure cavity (12) is formed between the first and second piston elements and loadable with pressure medium, wherein said first piston element (9) is movable in an axial direction, relative to said second piston element (10) of said second clutch device (4), and wherein said first and second clutch devices are simultaneously engageable based on a pressure difference between said first pressure cavity and said second pressure cavity.

2. The piston assembly (14) recited in claim 1, wherein a clutch component of said second clutch device (4) is supported at said piston element (9) of said first clutch device (3).

3. The piston assembly (14) recited in claim 1, wherein a clutch component (3.1) of said first clutch device (3) is supported at said piston element (9) of said first clutch device (3).

4. The piston assembly (14) recited in claim 1, wherein the piston surface areas of said piston elements (9, 10) of said actuatable clutch devices (3, 4), effective at said actuatable clutch devices (3, 4), are aligned in a same axial direction.

5. The piston assembly (14) recited in claim 1, wherein both piston elements (9, 10) are provided as disk or annular disk elements with essentially the same size piston surface area bounding said pressure cavity (12).

6. The piston assembly (14) recited in claim 1, wherein said first piston element (9) is provided as a ring or disk shaped element with a protrusion (19), aligned in said axial direction and extending in a radial direction, for supporting respective first and second clutch components (3.1, 4.1) of said first and second actuatable clutch devices (3, 4) and for guiding said second piston element (10), wherein a radially outer section is used to operate said first actuatable clutch device (3) and a radially inner section is used to define said pressure cavity (12).

7. The piston assembly (14) recited in claim 6, wherein said second piston element (10) is guided at said first piston element (9) through a portion of the protrusion (19) forming an inner circumferential surface, wherein the portion forming the inner circumference is provided as an outer multi disk carrier for said second actuatable clutch device (4), said second actuatable clutch device provided as a multi disk clutch, and the friction surface bearing elements of said first clutch component (4.1) of said second clutch device (4) are located between the stop and said second piston element (10).

8. The piston assembly (14) recited in claim 1, wherein a non-rotatable coupling between said clutch components (4.1, 3.1) and said first piston element (9) is formed by a spline shaft connection, or by complimentary teethings.

9. The piston assembly (14) recited in claim 1, wherein said pressure cavity (12) is sealed pressure and leak tight relative to the vicinity of said piston assembly (14) by a sealing device (27), and said sealing device (27) is provided as a contact seal between said first and second piston elements (9, 10).

10. The piston assembly recited in claim 1 wherein said second pressure cavity is sealed, regardless of positions of said first and second actuatable clutch devices, from said first pressure cavity and any other pressure cavities in said force transfer device.

11. A force transfer device (1), comprising two actuatable clutch devices (3, 4), said two actuatable clutch devices comprising first and second actuatable clutch devices, said actuatable clutch devices disposed in the force flow between an input (E) and an output (A) in a first pressure cavity (5) with an associated actuation device, comprising at least one respective piston element (9, 10) for each actuatable clutch device, with a first piston element for said first actuatable clutch device and a second piston element for said second actuatable clutch device, wherein one of said actuatable clutch devices (3, 4) is supported in an axial direction at said piston element (9, 10) of the other of said clutch devices (4, 3), wherein said first and second actuatable clutch devices are simultaneously engageable based on a pressure difference between said first pressure cavity and said second pressure cavity.

12. The force transfer device (1) recited in claim 11, wherein said two actuatable clutch devices (3, 4) are arranged so that a compression pressure in one of said clutch devices (3, 4) can be set higher than in said pressure cavity (5), surrounding said clutch devices (3, 4).

13. The force transfer device (1) recited in claim 11, wherein said two piston elements (9, 10) of said two actuatable clutch devices (3, 4) are provided as a piston assembly (14) for arrangement in a pressure cavity (5) of a force transfer device (1) for operating a first and a second actuatable clutch device (3, 4), wherein said second piston element (10) of said second clutch device (4) is guided at said piston element (9) of said first clutch device (3) and movable against a stop (13), wherein an additional second pressure cavity (12) is formed between said first and second piston elements, said second cavity loadable with pressure medium, wherein said first piston element (9) is movable in an axial direction, relative to said second piston element (10) of said second clutch device (4).

14. The force transfer device (1) recited in claim 13, comprising a hydrodynamic component (30) with a pump shell (P) and a turbine shell (T), wherein said first actuatable clutch device (3) is provided as a pump shell clutch (18), comprising a first clutch component (3.1), which can be connected at least indirectly non-rotatably with said input (E) and a second clutch component (3.2), which is connected non-rotatably to said pump shell (P) of said hydrodynamic component (30) of said force transfer device (1).

15. The force transfer device (1) recited in claim 14, wherein said second actuatable clutch device (4) is provided as a lockup clutch (19) for said hydrodynamic component (30), comprising a third clutch component (4.1) which is connected at least indirectly non-rotatably to said input (E), and a fourth clutch component (4.2), which is connected at least indirectly non-rotatably to said output (A), wherein said output comprises a transmission input shaft (2).

16. The force transfer device (1) recited in claim 14, wherein said turbine shell (T) of said hydrodynamic component is connected, at least indirectly non-rotatably, to said output (A).

17. The force transfer device (1) recited in claim 16, wherein the coupling of said turbine wheel (T) with output is performed by a hub (16), supporting the piston assembly (14).

18. The force transfer device (1) recited in claim 16, wherein the coupling of said turbine shell (T) is performed through a vibration damping device (38).

19. The force transfer device (1) recited in claim 13, wherein pressure control means are associated with the particular first and second pressure cavities.

20. A piston assembly for arrangement in a first pressure cavity of a force transfer device for operating a first actuatable clutch device and a second actuatable clutch device, said piston assembly comprising:
a first piston element and a second piston element, said piston elements associated respectively with said first and second actuatable clutch devices, wherein said second piston element of said second clutch device is guided by said first piston element of said first clutch device;
wherein a second pressure cavity is formed between said first and second piston elements and loadable with pressure medium, wherein said first piston element is movable in an axial direction, relative to said piston element of said second clutch device; and,
wherein said first piston element simultaneously acts as an inner carrier for a first clutch component of said first clutch device and an outer carrier for a second clutch component of said second clutch device.

* * * * *